US011012169B2

(12) United States Patent
Oksman et al.

(10) Patent No.: US 11,012,169 B2
(45) Date of Patent: May 18, 2021

(54) METHOD OF IMPULSE NOISE MONITORING FOR TIME DIVISION DUPLEXING SYSTEMS

(71) Applicant: Intel Corporation, Santa Clara, CA (US)

(72) Inventors: Vladimir Oksman, Morganville, NJ (US); Dietmar Schoppmeier, Unterhaching (DE)

(73) Assignee: MaxLinear, Inc., Carlsbad, CA (US)

( * ) Notice: Subject to any disclaimer, the term of this patent is extended or adjusted under 35 U.S.C. 154(b) by 76 days.

(21) Appl. No.: 16/300,668

(22) PCT Filed: Dec. 28, 2016

(86) PCT No.: PCT/US2016/068822
§ 371 (c)(1),
(2) Date: Nov. 12, 2018

(87) PCT Pub. No.: WO2017/218046
PCT Pub. Date: Dec. 21, 2017

(65) Prior Publication Data
US 2019/0288782 A1     Sep. 19, 2019

Related U.S. Application Data

(60) Provisional application No. 62/349,507, filed on Jun. 13, 2016.

(51) Int. Cl.
*H04B 17/345* (2015.01)
*H04L 1/00* (2006.01)
(Continued)

(52) U.S. Cl.
CPC ......... *H04B 17/345* (2015.01); *H04L 1/0041* (2013.01); *H04L 1/0045* (2013.01);
(Continued)

(58) Field of Classification Search
CPC ....... H04B 17/345; H04B 7/17; H04L 1/0041; H04L 1/0045; H04L 1/08; H04L 1/201
(Continued)

(56) References Cited

U.S. PATENT DOCUMENTS

| 6,498,808 | B1 * | 12/2002 | Tzannes | ................ H04L 5/0046 |
| | | | | 375/225 |
| 2007/0248181 | A1 * | 10/2007 | Clausen | ................... H04L 5/14 |
| | | | | 375/285 |

(Continued)

FOREIGN PATENT DOCUMENTS

| EP | 2228936 A1 | 9/2010 |
| EP | 2541825 A1 | 1/2013 |

OTHER PUBLICATIONS

International Search Report and Written Opinion dated Apr. 10, 2017 for PCT Application PCT/US2016/068822.
"Series G: Transmission Systems and Media, Digital Systems and Networks. Digital sections and digital line system—Metallic access networks." Improved impulse noise protection for digital subscriber line (DSL) transceivers. ITU-T G.998.4 (Jan. 2015) Telecommunication Standardization Section of ITU. International Telecommunication Union. 122 pages.

(Continued)

*Primary Examiner* — Ted M Wang
(74) *Attorney, Agent, or Firm* — Maschoff Brennan (57) ABSTRACT

A transceiver and associated method an impulse noise monitoring (INM) tool configured to identify a data stream that includes i) data transmission units (DTUs) communicating data symbols, ii) non-data symbols, and iii) non-transmission time. The INM tool is configured to ascertain an impulse noise (IN) event of the incoming data stream by evaluating a count, a frequency, a pattern, a group, or a sequence of corrupted DTUs and selected non-data symbols or non-transmission time that are proximate in time to the corrupted DTUs.

19 Claims, 5 Drawing Sheets

(51) Int. Cl.
  H04L 1/08 (2006.01)
  H04L 1/20 (2006.01)
  H04B 1/38 (2015.01)
(52) U.S. Cl.
  CPC ............... H04L 1/08 (2013.01); H04L 1/201 (2013.01); H04B 1/38 (2013.01)
(58) Field of Classification Search
  USPC .......................................................... 375/219
  See application file for complete search history.

(56) References Cited

U.S. PATENT DOCUMENTS

2008/0165905 A1\* 7/2008 Heise .................... H04L 1/0009
                                                                      375/346
2013/0003813 A1   1/2013 Schoppmeier

OTHER PUBLICATIONS

"Series G: Transmission Systems and Media, Digital Systems and Networks. Access networks—Metallic access networks." Fast access to subscriber terminals (G.fast)—Physical layer specification. ITU-T G.9701 (Dec. 2014) Telecommunication Standardization Section of ITU. International Telecommunication Union. 324 pages.
Series G: Transmission Systems and Media, Digital Systems and Networks. Digital sections and digital line system—Metallic access networks. Very high speed digital subscriber line transceivers 2 (VDSL2). ITU-T G.993.2 (Jan. 2015) Telecommunication Standardization Sector of ITU. International Telecommunication Union. 430 pages.

\* cited by examiner

METHOD OF IMPULSE NOISE MONITORING FOR TIME DIVISION DUPLEXING SYSTEMS

This application is a National Phase entry application of International Patent Application No. PCT/US2016/068822 filed Dec. 28, 2016, which claims priority to claims the benefit of U.S. Provisional Application 62/349,507 filed on Jun. 13, 2016, entitled "METHOD OF IMPULSE NOISE MONITORING FOR TIME DIVISION DUPLEXING SYSTEMS" in the name of Vladimir Oksman et al. and is hereby the contents of which are herein incorporated by reference in its entirety.

FIELD

The present disclosure relates to wireline communication, and monitoring of noise in wireline communication.

BACKGROUND

Transmission of data between a transmitter and a receiver, for example wireline transmission, e.g., xDSL transmission, or wireless transmission, may be governed by a number of communication parameters that may determine an amount of protection against various types of noise encountered. However, impulse noise may still degrade at least portions of the transmitted data.

Examples of such impulse noise may include single high impulse noise events (hereafter "SHINE") and repetitive electrical impulse noise (hereafter "REIN"). SHINE may occur as random, unpredictable noise events; while REIN may occur as noise from electrical means, and therefore may repeat at a constant period related to a local AC power frequency.

Time Division Duplexing (TDD) systems allocate different transmission time slots or symbol positions to an upstream transceiver and a downstream transceiver. With TDD, each transceiver shall not transmit during the other transceiver's transmission time slots, during which time the transceiver is expecting to receive symbols from the other transceiver. For the purposes of this description, this time during which a transceiver's peer transceiver is assigned transmission time slots will be called "non-transmission time." From the perspective of the non-transmitting transceiver, the non-transmission time is time during which the peer transceiver is sending data symbols, idle symbols, or "quiet symbols" in which no signal power is being transmitted. During its transmission time slots, the transceiver transmits data symbols, idle symbols, or quiet symbols.

In G.fast (ITU-T G.9701) the transmission time is divided into a normal operation interval (NOI) in which the transceiver continuously transmits symbols and a discontinuous operation interval (DOI) in which the transceiver may cease transmitting symbols for periods of time. During NOI if the transceiver does not have a data symbol to transmit, the transceiver transmits an idle symbol. During DOI if the transceiver does not have a data symbol to transmit, the transceiver transmits an idle symbol or a quiet symbol.

For the purposes of this description, a transmitter will be described as transmitting three types of symbols: data symbols, quiet symbols, and idle symbols. Data symbols carry or encode active user data. Idle symbols and quiet symbols may be referred to collectively as non-data symbols because they do not carry active user data. A non-data symbol may be considered as a symbol position that does not contain a data symbol. For the purposes of this description, sync symbols, which communicate synchronization information (e.g., a sequence of all 0s or all 1s) are referred to as non-data symbols. In some systems, an idle symbol is constructed using the (0,0) point of the direct channel constellation. No user data is transmitted on the line by idle symbols but in some transceivers sending an idle symbol effectively causes the transceiver to send crosstalk cancellation signal energy from other lines in a vector group to provide downstream crosstalk cancellation. A quiet symbol is to be understood as a symbol position in which the transceiver is not transmitting any data or any signal power. During transmission of a quiet symbol, the transceiver may be biased in such a manner as to maintain the same termination impedance it has on the line when it is transmitting data. Transmission of a quiet symbol effectively turns off the process of the transceiver for the symbol period resulting in power savings relative to the case where the transceiver is sending a data symbol.

DETAILED DESCRIPTION

In the embodiments disclosed and/or recited herein, communication devices, communications systems incorporating such communication devices, and corresponding methods and programs are described. Wire based communication systems, e.g., xDSL communication systems, disclosed and/or recited herein may be implemented as specified in, for example, ITU-T G.994, ITU-T G.992.3, ITU-T G.993.2, and ITU-T G.9701. The terminology used with respect to the description of such embodiments correspond to standard terminology used for these systems and is to be construed accordingly unless a definition of a specific term is given herein, in which case the definition given applies. However, such common terminology may also encompass corresponding elements in other types of communication other than DSL communication, such as wireless communication. Further, any connection that is described and/or recited herein as being wire-based may also be implemented as a wireless communication connection unless noted to the contrary.

For the embodiments disclosed and/or recited herein, the following terminology is provided.

A parameter, or communication parameter, may be regarded as a value that determines how data is sent from a transmitter to a receiver. An example of which may include a parameter that determines a data rate, a protection against noise, a modulation, or a format of data transmitted.

A framing parameter may be regarded as a parameter that determines the format of a frame or unit of data.

Forward error correction (FEC) may be regarded as subjecting data to be transmitted to a specific coding involving redundancy, e.g., Reed-Solomon encoding, so that data may be reconstructed in the event of partial data loss. That is, for forward error correction, data is submitted to specific coding thus generating code words which are then further processed for transmission.

A data transfer unit (DTU) may be regarded as a unit of data that may be subjected, as a whole, to coding for forward error correction. A DTU may include at least an identifier, e.g., a sequence identifier (SID) and, optionally, a time stamp (TS). A DTU is usable for retransmission. Additionally, in the context of xDSL transmission, a DTU includes an integer number of FEC code words when the DTU will be Reed-Solomon encoded. Furthermore, a data transfer unit may comprise an overhead for a checksum (Cyclic Redundancy Check) and so-called padding bytes.

Retransmission may be regarded as a technique by which the reliability of data transmission is increased. Retransmission takes into account the acknowledgement of transmitted DTUs by a corresponding receiver using, for example, the identifier of a DTU; however, if the transmitter of the DTU does not receive such an acknowledgement or receives a negative acknowledgement, the DTU may be retransmitted, i.e., transmitted again, possibly until a predetermined maximum time has expired.

A data transfer unit framer (DTU framer) may be regarded as an entity that generates data transfer units based on data to be transmitted.

Framing parameters for a DTU framer may, for example, include a number of Reed-Solomon codewords per DTU, a number of padding bytes per DTU, or a framing type that may define the DTU framing structure. Example communication parameters for retransmission of DTU may include, for example, a delay between two consecutive transmissions of the same DTU. A more particular example may include a framing parameter referred to, according to G.998.4, as, e.g., $Qt_x$, which may be pre-selected by a receiver during "training" between a transmitter and the receiver. Accordingly, $Qt_x$ may be predetermined based on a calculation that the transmitter may retransmit a DTU after $Qt_x$ DTUs if the transmitted DTU has not been acknowledged positively during this time frame. Further example communication parameters for transmission may include, for example, defining a roundtrip time or half roundtrip time. Roundtrip may be regarded as time needed to transmit a DTU from a transmitter to a receiver and receiving the corresponding acknowledgement again at the transmitter. In RTX systems according to G.9701, $Qt_x$ is not a framing parameter and defines a maximum time between two subsequent transmission.

Modern high-speed communication systems over twisted pair usually use crosstalk cancellation, which reduces substantially the stationary noise at the input of the receiver. Thus, non-stationary noise becomes one of the main noise components. Examples of non-stationary noise are narrowband and wide-band RFI, operation of other broadband communication systems, such as PLC, or unexpected changes in channel characteristics, such as disordered disconnect of lines in the binder. Modern transceivers include components designed to protect against these noise components.

Modern DSL system are equipped with tools for impulse noise (IN) protection/mitigation, including both REIN and SHINE, but these tools require some knowledge about main characteristics of the impulse noise. One way to obtain these characteristics is by measuring the actual DSL line. These measurements should be non-intrusive, since such measurement involves a long observation time, data collection and analysis. This disclosure describes a method of impulse noise monitoring (INM) for very high speed DSL systems, such as G.fast, that use time division duplexing (TDD). The noise monitoring system and method, however, can also be used for systems using continuous transmission, such as using frequency division duplexing (FDD) and echo cancelling (EC).

Impulse noise monitoring (INM) is currently used in VDSL2, (see, e.g., ITU-T Recommendation G.993.2). VDSL2 uses continuous transmission and each receiver identifies the presence of IN by detecting so-called "severely corrupted" or "erased" symbols, those which have multiple damaged subcarriers or other signs of severe corruption. For the purposes of this description, the term "corrupted symbol" means symbols that that were erased by impulse noise, i.e., all DTUs or part of the DTUs carried by the symbols were corrupted. The receiver further detects the presence of so-called "clusters of corrupted symbols," which are further interpreted as "impulse noise events." The main disadvantage of the method used in VDSL2 is the complexity and ambiguity in the detection of "severely corrupted symbols." Further, the VDSL2 uses continuous transmission, and the method is performed at both sides of the line meaning that results obtained at the customer premise equipment (CPE) have to be communicated to the CO. The latter adds load on the embedded operations channel (eoc) that is used in VDSL2 for management communications.

These disadvantages were partially solved using a retransmission function based approach, (see, e.g., ITU-T Recommendation G.998.4.) In VDSL2 systems using G.998.4, data for transmission is encapsulated into data transmission units (DTUs), and reception of each DTU is acknowledged. Clusters of corrupted DTUs (i.e., retransmitted DTUs) may be used as signs of impulse noise presence. In other words, a retransmitted DTU is interpreted as evidence that IN was occurring when the DTU was originally transmitted. However, in the retransmission based approach, corrupted DTUs are detected during continuous transmission only and are not suitable for TDD systems which include periods of time in which no DTUs are being received. The retransmission approaches are based on a specific representation of acknowledgement information in G.998.4 and may not be applicable to other similar systems in which a different format of acknowledgment information is used. Further, retransmission of a single DTU does not necessarily indicate an IN event, which corresponds to a "severe corruption" or "erasure" of a symbol.

One way to apply INM methods for TDD, in which part of the transmission frame is blanked for transmission in the opposite direction is to use the entire transmission frame as a unit of corrupted time, i.e., consider a transmission frame as corrupted if one or more DTUs transmitted in the frame are corrupted and consider a transmission as not corrupted otherwise. Further, appearance of corrupted transmission frames may be considered as an event of impulse noise, so that the method could be used for both continuous transmission (e.g., during FDD) and discontinuous transmission (e.g., during TDD). The disadvantage of this technique is coarse estimation, unless duration of the transmission frame is very short (which is usually inefficient and thus is not often used).

As mentioned above, the INM methods used for conventional noise monitoring have one or more of the following disadvantages and limitations: complexity, inaccuracy, they operate for continuous transmission (such as FDD or EC), but cannot address TDD or other types of discontinuous transmission, some are attached to a specific acknowledgement protocol, and they involve implementation from both sides of the line.

This disclosure presents an INM solution that is intended to be used for both discontinuous transmission such as TDD and continuous transmission (FDD, EC) and can also accommodate discontinuous operation (DO) defined for G.fast (see, e.g., ITU-T Recommendation G.9701).

Figure 1:
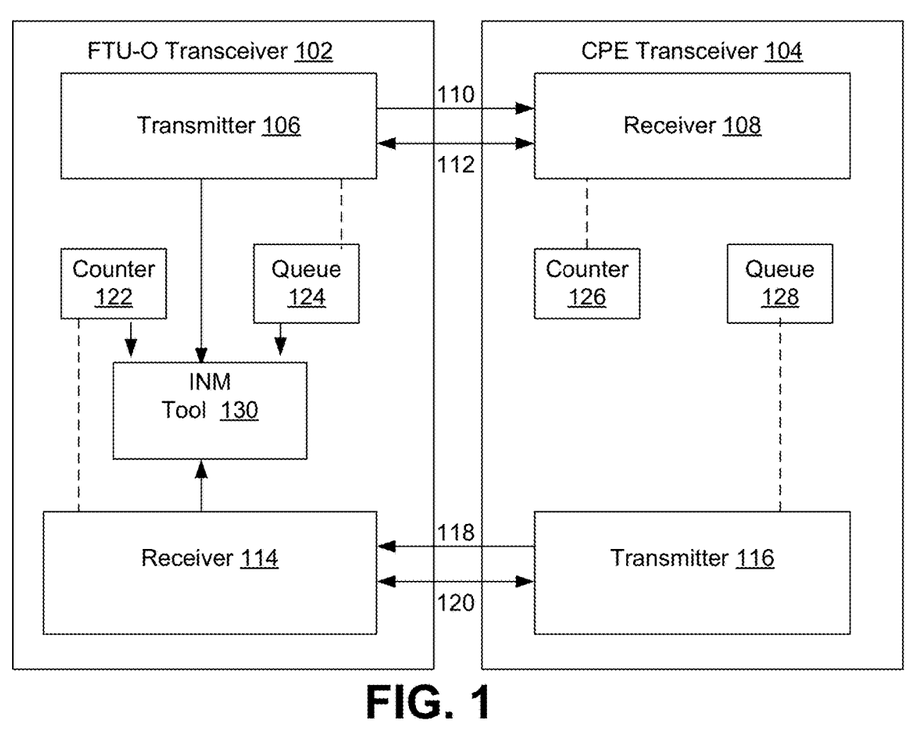
FIG. 1 is a block diagram of a transceiver that includes one embodiment of a INM tool for use during time division duplex (TDD) operation.

FIG. 1 shows a block diagram of one embodiment of a TDD communication system in which an exemplary impulse noise detection technique may be implemented. The communication system includes, at least, a first transceiver 102 and a second transceiver 104. The components disclosed and/or recited herein, which are not necessarily inclusive of all such components, may be implemented as software in execution on a processor, firmware, hardware, or any combination thereof.

The first transceiver 102 includes, at least, a first transmitter 106 and a first receiver 114. The second transceiver 104 includes, at least, a second transmitter 116 and a second receiver 108. For the purposes of this description, the first transceiver 102 is the head-end that resides at the central office (CO), at the street cabinet, or at the distribution point (DPU) and is called the FTU-O. For the purposes of this description, the second transceiver 104 resides at the customer premises equipment (CPE) and is called the FTU-R. In other embodiments, the roles of FTU-O and FTU-R may be switched and/or the functionality described with respect to INM (i.e., INM tool 130) as being implemented in the FTU-O may be partially or entirely migrated to the FTU-R.

The first transmitter 106 transmits and retransmits data via a communication channel 110 to the second receiver 108. Retransmission request channel (RRC) 112 carries acknowledgements for DTUs received at the receiver 108. The second transmitter 116 transmits and retransmits data via a communication channel 118 to the first receiver 114. Retransmission request channel (RRC) 120 carries acknowledgements for DTUs received at the receiver 114. In some implementations, RRC is implemented as a part of another management channel, e.g., in G.fast the RRC is implemented within the Robust Management Channel (RMC).

Counters 122 and 126 count acknowledged (i.e., positively acknowledged) DTUs received at the receiver 114 and receiver 108, respectively. Further, the counters 122 and 126 may run synchronously for the pairing of the transmitter 106 and the receiver 108 and for the pairing of the transmitter 116 and the receiver 114, respectively. In some implementations, DTUs received in error or lost are negatively acknowledged (NACKed), while in other implementations no acknowledgement is sent for DTUs received in error.

Retransmission queue 124 may receive a copy of DTUs transmitted from the transmitter 106 to the receiver 108 upon transmittal. A retransmission timer based on the framing parameters for DTU framer may then be started upon receipt at the retransmission queue 124. Retransmission queue 124 may be kept sorted by time frame increments for segments of the transmitted DTUs. If an acknowledgement of successful transmission is received before, e.g., another $Qt_x$ DTUs are transmitted, the corresponding segment of DTUs may be removed from retransmission queue 124. If an acknowledgement of successful transmission is not received before another $Qt_x$ DTUs are transmitted, the corresponding segment of DTUs may recalled from queue 124 to be retransmitted from transmitter 106. The retransmission queue 128 is similarly utilized with respect to the receiver 108.

First transmission channel 110 and second transmission channel 118 may be implemented in the same physical medium, for example a wireline using xDSL transmission, in which different frequency ranges (in the case of FDD) or different time ranges (in case of TDD) may be assigned to first transmission channel 110 and second transmission channel 118.

The data transmission from the first transmitter 106 to the second receiver 108 and/or the data transmission from the second transmitter 116 to the first receiver 114 may involve FEC and retransmission. In particular, the data may be transmitted using DTUs, and DTUs that are not acknowledged as being received may be retransmitted.

As will be described in more detail below with reference to FIG. 1A, an impulse noise monitoring (INM) tool 130 is utilized in transceiver 102 to derive the duration of an impulse noise event, the inter-arrival time of impulse noise events, and potentially other parameters, after the existence of impulse noise has been detected in either of communication channels 110 and 118, respectively. The INM tool 130 generates IN event parameters that describe each detected IN event in terms of a number of time (which, in some embodiments is expressed in terms of a number of symbols). The IN event parameters characterize the experienced IN events for use in configuring IN protection/mitigation tools.

Impulse noise is typically defined, for noise mitigation tool purposes, as a noise event that is usually powerful enough to erase a complete symbol. Therefore, "erased" or "severely corrupted" symbols are used as an indicator of impulse noise. The "erasure" phenomena is because FFT propagates errors over the symbol, i.e., if a substantial number of samples of a symbol in time domain are severely corrupted, it is likely that after FFT this corruption will propagate over all frequency domain samples of the received symbol.

Figure 2A:
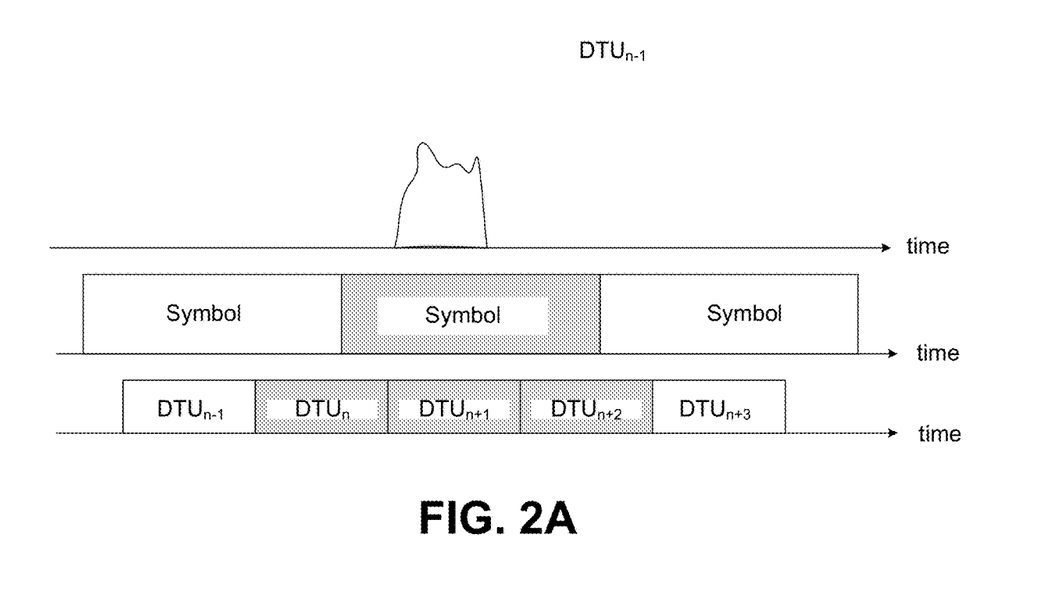
FIG. 2A is a schematic diagram illustrating an example of a data transfer unit (DTU) corruption due to a single short impulse noise event.

To avoid complexity of detecting FFT samples of each symbol or specific encoding or modulation patterns inside each symbol, the indication of corrupted symbols associated with a single IN event is obtained by grouping (clusters, specific sequences, patterns) of corrupted DTUs. For example, if a symbol is erased and the size (number of bytes) in a DTU is less than a size of a symbol, all DTUs communicated using this symbol (fully or partially) will be likely corrupted. This is illustrated in FIG. 2A showing impulse noise that erases one symbol and three DTUs which parts are modulated on this symbol.

It should be noticed that due to interleaving inside a DTU, a certain amount of DTUs in which only a very small part is modulated on a corrupted symbol may be recovered by forward error correction (FEC). This will be discussed in more detail below concerning the accuracy of impulse noise representation.

Figure 2B:
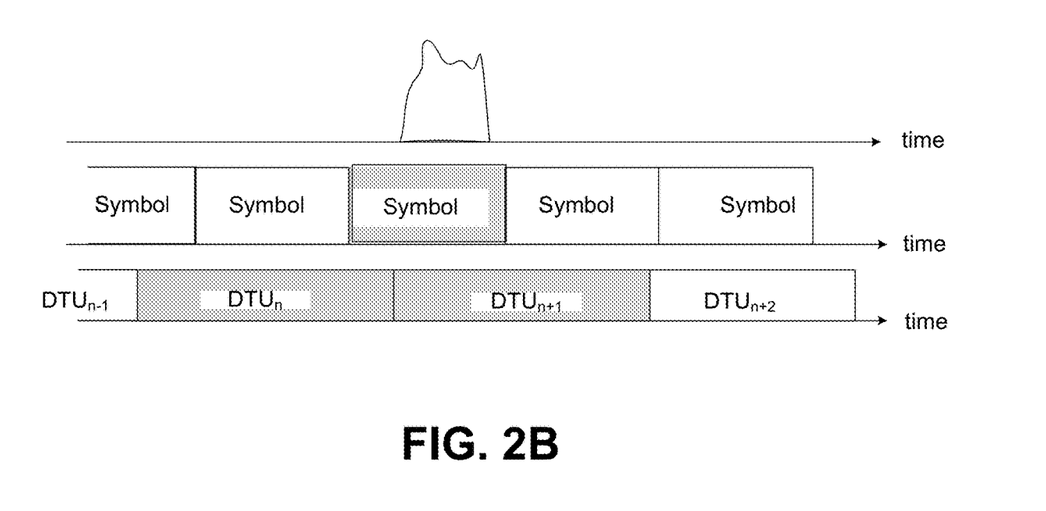
FIG. 2B is a schematic diagram illustrating an example of a DTU corruption due to a single short impulse noise event.

The case in which the size of a DTU is bigger than one symbol is presented in FIG. 2B. It differs from the previous case by the accuracy of impulse noise representation, which is also addressed below.

When multiple symbols are corrupted by impulse noise, this corruption will generate a group of corrupted DTUs (all or vast majority of them). Therefore the boundaries of an impulse noise event that affected a certain transmission direction can be determined by detecting sequences or patterns of corrupted DTUs or sequences of DTUs among which vast majority is corrupted. By mapping the detected groups of corrupted DTUs to corrupted symbols, and then clustering the corrupted symbols, a cluster of corrupted symbols is obtained. The first and the last symbols of the cluster are then used to define the impulse noise event, i.e., the presence of the IN event, the time allocation of the IN event, and the duration of the IN event. With use of TDD and DO, as in G.fast, the transmission of symbols by either transceiver is discontinuous, meaning that the interpretation of impulse noise events, especially in identifying clusters of corrupted symbols, is more complex.

Returning to FIG. 1, the INM tool 130 is configured to interpret IN events during TDD, DO, and continuous transmission operation. The INM tool 130 is capable of performing IN monitoring in both directions from the FTU-O transceiver by monitoring DTU acknowledgement information from the FTU-R transceiver and associating the acknowledgement information with the actually transmitted and retransmitted DTUs. The INM tool 130 is configured to monitor received DTUs and translate the detected patterns of corrupted DTUs into clusters of severely corrupted symbols, thus increasing the accuracy of IN event detection. The INM tool 130 addresses the TDD nature of G.fast and discontinuous operation (DO) by bridging or combining groups of corrupted DTUs in adjacent transmission frames to identify an IN event that spans the blanked portion of the transmission frame of quiet time during DO or when the other transceiver is transmitting ("transmission in opposite direction). (See FIG. 3).

In some embodiments, the receiver is allowed to send "false" NACK information when a DTU is not corrupted in the line but some internal issue with the receiver caused a problem with receiving the DTU (e.g., lack of memory in the receiver). Due to the possibility of false NACK information, NACK information associated with a DTU does not always indicate the occurrence of IN. Thus, NACK information should be used for IN monitoring when false NACK information is somehow marked by the receiver or special rules as being defined so that the false NACK information may be ignored in IN detection. If false NACK information is not identifiable as such, it may be advantageous to deploy an INM tool or selected aspects of the downstream INM tool in the FTU-R to collect IN data for the DTUs it receives and to transmit the data to the FTU-O using the eoc.

In some embodiments the INM tool 130 is configured to detect IN events in the upstream path 110 and the downstream path 118 and correlate these IN events to discover powerful IN events that hit both transmission directions. For example, detected IN events which occur in both the upstream path and the downstream path at the same time and having the same length are declared as correlated IN events. This is more likely to occur in G.fast since transmission lines are very short and allow powerful low-frequency IN events to propagate with very small attenuation.

Figure 1A:
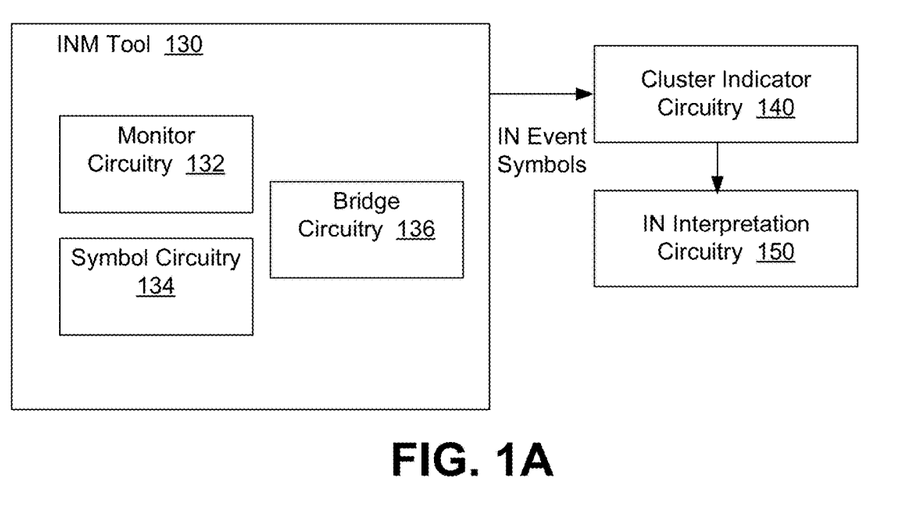
FIG. 1A is a block diagram of one embodiment of the INM tool of FIG. 1.

FIG. 1A illustrates one embodiment of the INM tool 130. The INM tool includes monitor circuitry 132, symbol circuitry 134, and bridge circuitry 136. While the INM tool 130 is illustrated as including all three of the monitor circuitry 132, symbol circuitry 134, and bridge circuitry 136, in other embodiments, the INM tool 130 embodies a selected subset of the INM functionality described herein and includes a selected corresponding one or two of the circuitries rather than all three. As already discussed, in some embodiments, both the FTU-O and FTU-R include an INM tool 130 either of which may include a selected subset of the INM functionality described herein and therefore include a selected corresponding one, two, or three of the monitor circuitry 132, symbol circuitry 134, and bridge circuitry 136.

In one example system, the INM tool 130 outputs IN event parameters in terms of a number of symbols (which correlates to a length of time in symbol positions) and an inter arrival time between IN events to cluster indicator circuitry 140. The cluster indicator circuitry 140 uses cluster continuation parameters to cluster the IN events into larger events (e.g., clusters of symbols). The clusters of symbols identified by the cluster indicator circuitry 140 is provided to IN interpretation circuitry 150 that determines different parameters that may be used to mitigate future IN events.

The monitor circuitry 132 detects corrupted DTUs that are received by the transceiver 102 using any one of many different methods. For example, the monitor circuitry 132 may detect corrupted RS code words or a DTU-specific CRC. In one example, the monitor circuitry 132 can also detect DTUs that were transmitted by the transceiver 102 and were corrupted prior to being received by the transceiver 104. This allows IN interpretation functions to be performed by the FTU-O transceiver 102 without requiring the FTU-R transceiver 104 to determine or communicate any IN-specific information to the FTU-O transceiver. Recall that TDD systems may utilize an acknowledgement and retransmission based protocol in which the receiver communicates information of the received corrupted (and sometimes also non-corrupted) DTUs back to the transmitter. In general, the INM tool 130 interprets a DTU that had to be retransmitted as indicating that the prior transmission of the DTU was a corrupted DTU. Clusters of corrupted DTUs are interpreted by the INM tool 130 as indicating one or more symbols that were transmitted by the transceiver 102 and were corrupted due to IN.

The INM tool 130 uses the acknowledgement information received by the transmitter 106 from the receiver 108 on channel 112 to detect corrupted DTUs transmitted on channel 110. Each transmitted DTU in the queue 124 carries its ID and the time stamp of the original transmission to allow the receiver 108 to recover timing integrity after retransmission and discard any outdated DTUs. The monitor circuitry 132 keeps the timestamp or the sequential order of each re-transmitted DTU (i.e., corrupted) and in this manner recovers the exact time boundaries of the impulse noise event. While such a technique is subject to the delay in the line, the line delay may be considered negligible as compared to the practically important accuracy of IN event detection.

In G.fast the acknowledgement data received on channel 112 contains the sequence of ACK/NACK bits for each transmitted DTU in the order of their actual transmission. For interpreting at the head-end (FTU-O) the IN events on channel 110 (e.g., at the FTU-R), the monitor circuitry 132 is configured to associate the ACK/NACK bits from the FTU-R acknowledgement information received on channel 112 with the transmitted DTUs in the queue 124 and their timing relatively to transmitted symbols. This way, the monitor circuitry 132 can detect IN events at both ends of the line (e.g., on channel 110 and 118) and no load on the eoc is needed to communicate INM metrics from the FTU-R to the FTU-O. Similarly, the FTU-O may get rid of false negative acknowledgements (NACKs) on idle or quiet symbols, which may be transmitted on the time positions of data symbols during DO.

Figure 3:
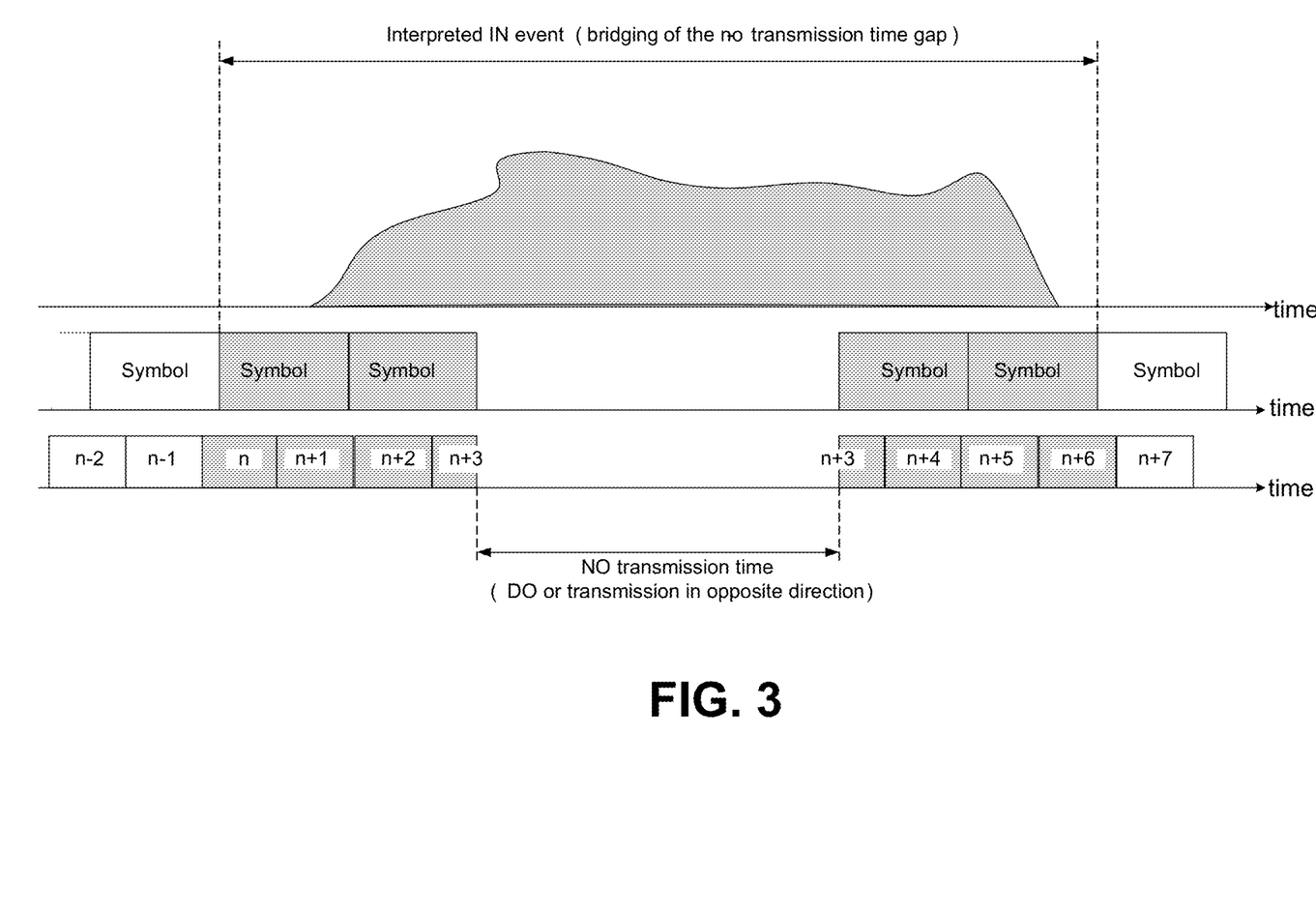
FIG. 3 is a schematic diagram illustrating an example of an impulse noise interpretation in a discontinuous transmission arrangement by using bridging.

The bridge circuitry 136 is configured to include non-transmission time and non-data symbols that occur between (or are interleaved with) corrupted DTUs in a detected IN event (see FIG. 3). In one example in the downstream direction, when the transceiver 102 receives a series or pattern of corrupted DTUs that include quiet symbol time slots or idle symbol time slots (e.g., during the transceiver's transmission time), the bridge circuitry 136 includes the quiet or idle symbol time slots in the IN event that includes the corrupted received DTUs. In one example in the upstream direction, to get rid of false NACKs or idle or quiet symbols generated due to DO or transmission in the opposite direction, the transmitting FTU (e.g., FTU-R) sends an indication in every frame regarding the actual positions in which idle and quiet symbols are transmitted. In some examples, (e.g., G.fast) this indication includes the position of the last data symbol transmitted in each frame, the positions of quiet symbols during the time assigned for upstream transmission, and the time during which only data symbols are allowed. The bridge circuitry 136 uses this information to include non-data symbol positions interleaved with corrupted transmitted DTUs in the same IN event.

When the FTU-O is allowed to generate false NACKS on some data symbols, the same indications are used by the FTU-R in the downstream direction to get rid of false NACKs on idle and quiet symbols.

In case the communication channel from the FTU-R to the FTU-O is damaged (no acknowledgements are available, e.g., in G.fast acknowledgements are sent to the FTU-O via the upstream robust management channel) the INM tool 130 will consider as unavailable time for INM: this time can't last long: the acknowledgement channel is either restored or the entire line is dropped for re-initialization.

The symbol circuitry 134 is configured to determine the number of consequent severely corrupted symbols by identifying clusters of consequent corrupted DTUs. With this approach, the boundaries of derived impulse noise event determined by the symbol circuitry 134 are wider than real impulse noise. This is because the error caused by noise propagates over the entire symbol and further propagates over the DTU, which part is carried by the corrupted symbol. With all this, the maximum inaccuracy in estimation of impulse noise event duration depends on the size of the DTU.

If the number of DTUs per symbol is bigger than or equal to 1 (i.e., the DUT size in bytes is smaller than the size of a symbol), a cluster of N corrupted DTUs corresponds to the number of corrupted symbols D generated by the noise event is computed by the symbol circuitry 134 as:

$$D=\text{floor}(N/\text{number\_of\_DTUs\_per\_symbol}).$$

Accordingly, the inaccuracy is less than 2 symbol periods (and can be even counted less than 1.8 symbol period, because corruption of cyclic extension causes no errors). The latter can be represented as a deviation $\Delta=\pm 0.9$ Ts from a median value, where $T_{symb}$ is the duration of symbol period. For $T_{symb}=21$ us (a typical value for G.fast), $\Delta=\pm 18$ us.

Figure 4:
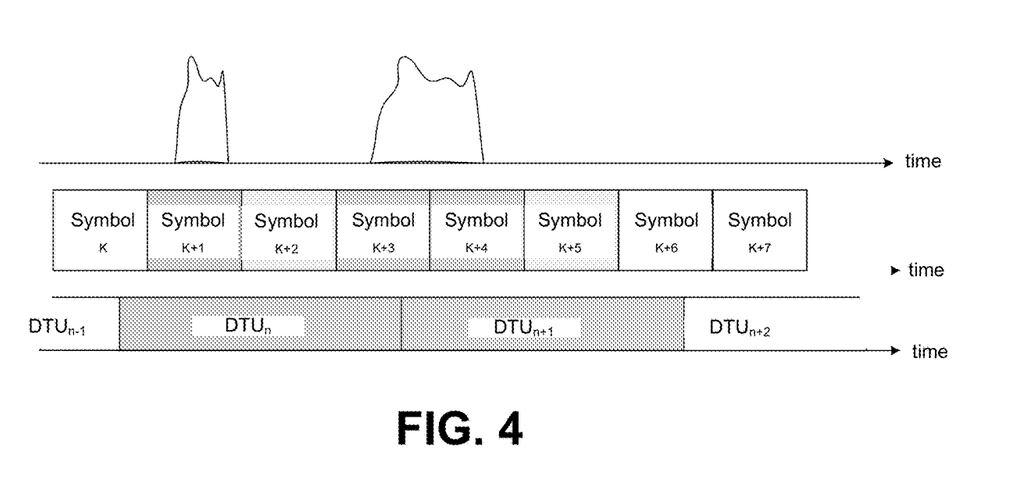
FIG. 4 is a diagram illustrating a scenario that describes accuracy in an example where the DTU>Ts.

In case the number of DTUs per symbols is smaller than 1 (i.e., the DTU size in bytes is bigger than the size of a symbol), the inaccuracy will be higher, because same DTU may be corrupted by a short impulse noise spike, by multiple spikes, or by a long spike, as shown by the example in FIG. 4.

Referring to FIG. 4 in which the number of DTUs per symbols is 0.3, two corrupted DTUs (#n and #n+1) may be corrupted because: (1) only symbol #(k+3) is corrupted, or (2) any symbol with index less than #(k+3) and any symbol with index more than #(k+3) are corrupted, or (3) a combination of above. Thus the number of corrupted symbols causing the impulse noise event presented in FIG. 4 can be from 1 to 5.

Generally, the maximum number of corrupted symbols that can correspond to a cluster of N corrupted DTUs is computed by the symbol circuitry 134 as:

$$D=\text{ceiling}(N/\text{number\_of\_DTUs\_per\_symbol})-1,$$

while the minimum number of corrupted symbols actually forming the noise even can be as small as N−1 (and corrupted symbols may not be consecutive). Concerning the inaccuracy of the noise event duration, the maximum inaccuracy in the symbols computed by the symbol circuitry 134 is:

$$D=2\times[\text{floor}(1/\text{number\_of\_DTUs\_per\_symbol})-1].$$

In the worst case, when a symbol can carries 0.25 DTU, the inaccuracy $6T_{symb}$, or is up to $+3T_{symb}$. For $T_{symb}$ of 21 us, the inaccuracy is ±63 us from the computed median value.

It should be noticed that the presented inaccuracy is the worst case and depends on a particular appearance time, duration, and shape of the impulse noise event. For systems using short symbols, such as G.fast and similar Gb/s systems, the symbol circuitry 134 computes a fairly accurate count of corrupted signals for IN mitigation purposes.

To compensate for the discontinuous nature of TDD, the bridge circuitry 136 is configured to consider non-data symbol positions that include opposite direction symbols, time gaps, DOI quiet signals, DOI idle symbols, and NOI idle symbols. In one embodiment, the bridge circuitry 136 detects and interprets IN events based on the following principles. If a group of corrupted DTUs is detected (i.e., using ACK information or directly, e.g., by a wrong DTU-specific CRC) at the end of one transmission frame and at the beginning of the following transmission frame these groups of corrupted DTUs are "bridged" and are thus considered to belong to a single IN event (see FIG. 3).

In one embodiment, if the receiver 114 is able to identify a severely corrupted idle symbol by multiple non-zero FFT samples, the receiver considers the severely corrupted idle symbols for IN event interpretation (if an idle symbol is not corrupted, all FFT samples are zero). In some implementations receivers are not designed to detect idle symbols and thus can issue a false NACKs in response to receiving an idle symbol. To avoid these false NACKs being interpreted as a corrupted DTUs, the monitor circuitry 132 should exclude idle symbol positions from monitoring of corrupted DTUs, as described above.

In summary, the INM tool 130 includes monitor circuitry 132, symbol circuitry 134, and bridge circuitry 136. The monitor circuitry 132 is configured to detect corrupted DTUs. In one embodiment the monitor circuitry 132 detects corrupted DTUs that are received by the FTU-O using, for example, a DTU specific CRC check and detects corrupted DTUs that were transmitted by the FTU-O by receiving information about corrupted DTUs from the FTU-R on the eoc. In another embodiment, the monitor circuitry 132 is configured to map transmitted DTUs in the transmission queue to symbols and use ACK information received from the FTU-R to detect corrupted transmitted symbols. The symbol circuitry 134 is configured to translate groups of corrupted DTUs to a number of corrupted symbols. The bridge circuitry 136 is configured to include, in some circumstances, non-data symbol time slots that are interleaved with the corrupted symbols into respective IN events. The duration of the IN event is determined by the time boundaries of severely corrupted symbols that are identified using particular patterns and groups of corrupted DTUs.

Figure 5:
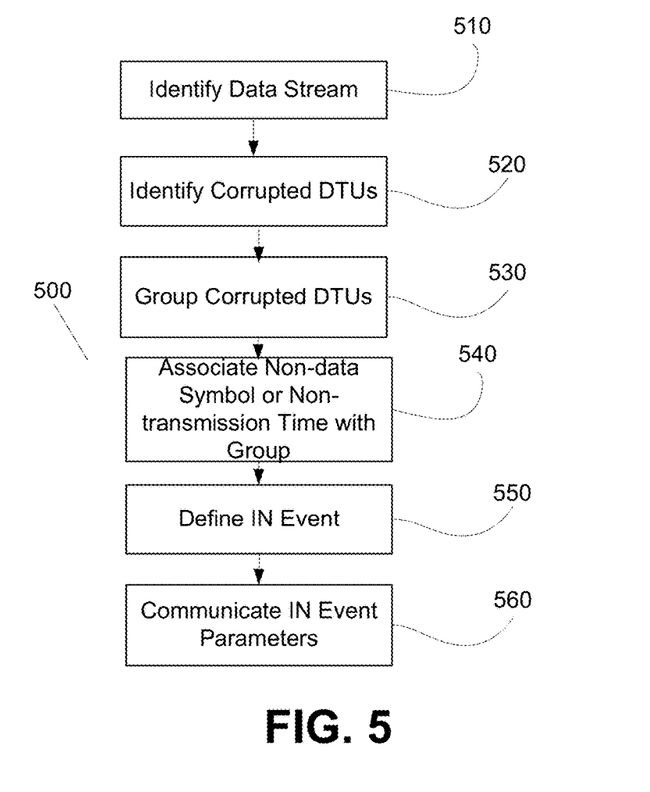
FIG. 5 is a flow diagram of one embodiment of a method of identifying a noise event during TDD operation.

FIG. 5 illustrates one embodiment of a method 500 configured to determine an impulse noise characteristic. The method 500 includes, at 510, identifying a data stream transmitted or received by a transceiver that includes i) data transmission units (DTUs) communicating data symbols, ii) non-data symbols, and iii) non-transmission time. At 520, one or more corrupted DTUs in the data stream are identified. Corrupted DTUs are grouped into groups of corrupted DTUs by evaluating a count, frequency, pattern, cluster, or sequence of the corrupted DTUs at 530. The method includes, at 540, associating a number of non-data symbol time slots and/or non-transmission time with the group of corrupted DTUs and, at 550, an IN event is defined that includes the non-data symbol time slots and/or the non-transmission time and the group of corrupted DTUs. At 560 one or more IN event parameters describing the IN event are communicated to IN noise mitigation circuitry for use by the transceiver in mitigating IN.

In one embodiment, the method includes converting the group of corrupted DTUs to corresponding number of corrupted data symbols on which the corrupted DTUs are mapped; and characterizing the IN event as having a time duration corresponding to the number of corrupted data symbols and the number of non-data symbols associated with the group of corrupted DTUs. The method may also include characterizing a first corrupted data symbol and a last corrupted data symbol as the start and stop time boundaries of the IN event.

The method may include identifying a first sequence of corrupted data symbols detected at an end of one transmission frame; identifying a second sequence of corrupted data symbols detected at a beginning of a next subsequent transmission frame; and identifying a single IN event that includes the first sequence of corrupted data symbols, the second sequence of corrupted data symbols, and non-data symbols occurring between the first sequence and the second sequence.

The method may include identifying a DTU transmitted by the transceiver as a corrupted DTU by: mapping DTUs in a retransmit queue to transmitted symbols; and identifying transmitted symbols corresponding to DTUs in the retransmit queue that are retransmitted as corrupted DTUs.

The method may include identifying a first IN event that includes corrupted DTUs received by the transceiver and a second IN event that includes corrupted DTUs transmitted by the transceiver that have a similar duration and inter arrival time; and identifying the first IN event and the second IN event as correlated IN events occurring on both a transmit channel and a receive channel of the transceiver.

The main INM parameters or metrics output by the method 500 or the INM tool 130 (e.g., to cluster indication circuitry 140) that are used by mitigation circuitry (e.g. IN interpretation circuitry 150) for setting of appropriate DSL transmission and IN mitigation parameters are: (1) the duration of IN event (e.g., a total number of clustered corrupted symbols and interleaved non-data symbols associated with the IN event), and (2) the inter-arrival time of IN events. These events are often presented in the form of histograms, which usually allow for identification of REIN vs SHINE based on their inter-arrival time, and IN length.

In some embodiments, the computed metrics of interpreted IN events are used to adjust the transmission parameters of DSL systems, such as correction capability of forward error correction (FEC), the maximum lifetime of retransmitted DTUs, and others. These adjustments may be performed either by restarting the system with new IN-related parameters or by operating OLR procedures that modify these relevant parameters during showtime.

Figure 6:
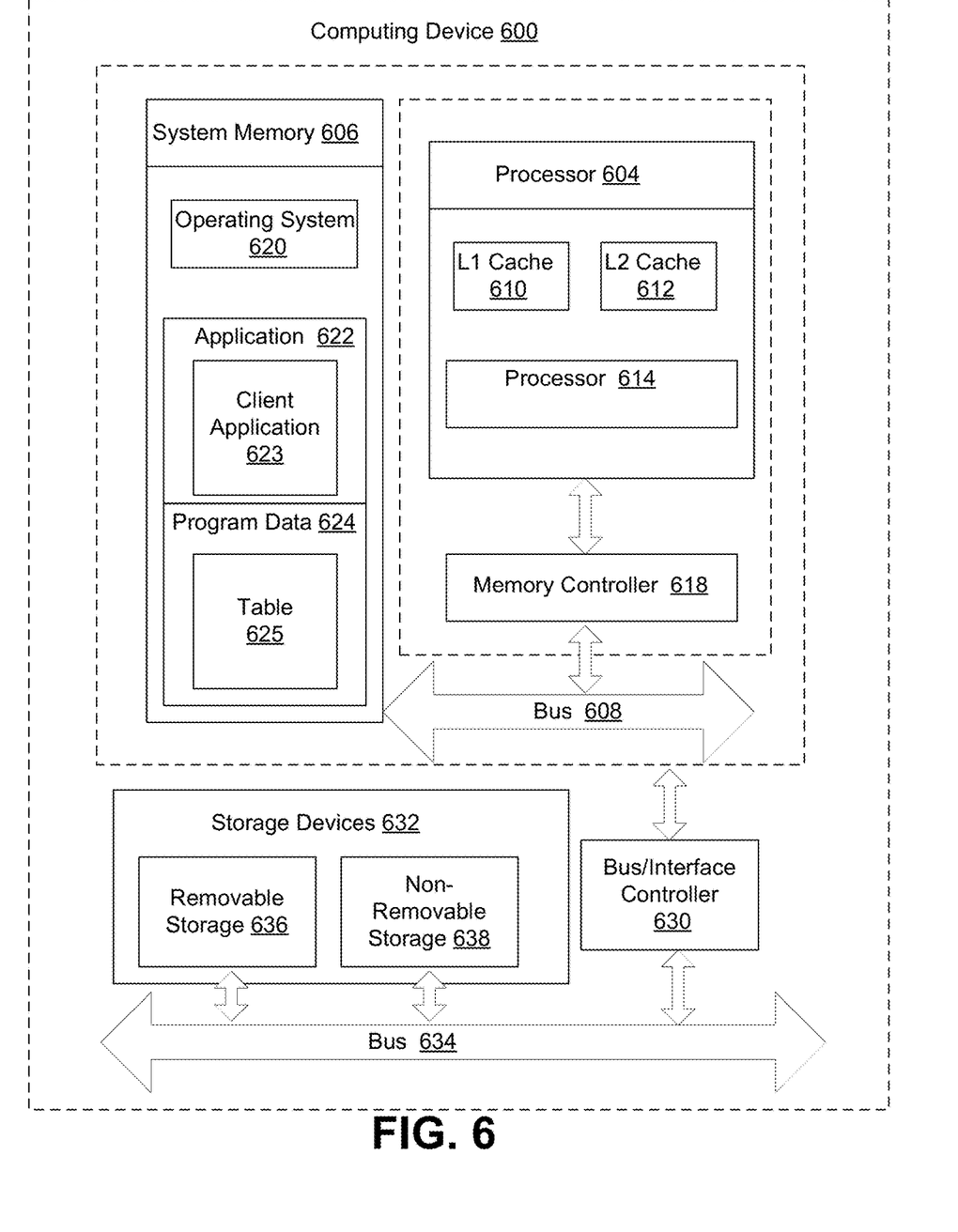
FIG. 6 illustrates an example computing embodiment, in which any of the operations, processes, etc. described herein may be implemented.

FIG. 6 shows an illustrative computing embodiment, in which any of the operations, processes, etc. described herein may be implemented as computer-readable instructions stored on a computer-readable medium. The computer-readable instructions may, for example, be executed by a processor of a mobile unit, a network element, and/or any other computing device.

In an example configuration 602, computing device 600 may typically include one or more processors 604 and a system memory 606. A memory bus 608 may be used for communicating between processor 604 and system memory 606.

Depending on the desired configuration, processor 604 may be of any type including but not limited to a microprocessor, a microcontroller, a digital signal processor (DSP), or any combination thereof. Processor 604 may include one more levels of caching, such as level one cache 610 and level two cache 612, and processor core 614.

An example processor core 614 may include an arithmetic logic unit (ALU), a floating point unit (FPU), a digital signal processing core (DSP Core), or any combination thereof. Processor 114 may be implemented as processor core 614. Further, example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. Storage 112 may be implemented as memory 606 in at least one embodiment of system 100. System memory 606 may include an operating system 620, one or more applications 322, and program data 624.

Application 622 may include Client Application 623 that is arranged to perform the functions as described herein including those described previously with respect to FIGS. 1 and 2. Program data 624 may include Table 625, which may alternatively be referred to as "figure table 625" or "distribution table 625."

Computing device 600 may have additional features or functionality, and additional interfaces to facilitate communications between basic configuration 602 and any required devices and interfaces. For example, bus/interface controller 630 may be used to facilitate communications between basic configuration 602 and one or more data storage devices 632 via storage interface bus 634. Data storage devices 632 may be removable storage devices 636, non removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636, and non-removable storage devices 638 are examples of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

The present disclosure has been described with reference to the attached drawing figures, wherein like reference numerals were used to refer to like elements throughout, and wherein the illustrated structures and devices are not necessarily drawn to scale. As utilized herein, terms "tool," "circuitry," "component," "system," "interface," and the like are intended to refer to a computer-related entity, hardware, software (e.g., in execution), and/or firmware. For example, a "circuitry" or "tool" can be a processor (e.g., a microprocessor, a controller, or other processing device), a process running on a processor, a controller, an object, an executable, a program, a storage device, a computer, a tablet PC, an electronic circuit and/or a mobile phone with a processing device. By way of illustration, an application running on a server and the server can also be a component. One or more "circuitries" can reside within a process, and a "circuitry" can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Examples herein can include subject matter such as a method, means for performing acts or blocks of the method, at least one machine-readable medium including executable instructions that, when performed by a machine (e.g., a processor with memory or the like) cause the machine to perform acts of the method or of an apparatus or system for concurrent communication using multiple communication technologies according to embodiments and examples described.

Example 1 is a transceiver that includes an impulse noise monitoring (INM) tool configured to identify a data stream that includes i) data transmission units (DTUs) communicating data symbols, ii) non-data symbols, and iii) non-transmission time. The INM tool is also configured to ascertain an impulse noise (IN) event of the incoming data stream by evaluating a count, a frequency, a pattern, a group, or a sequence of corrupted DTUs and selected non-data symbols or non-transmission time that are proximate in time to the corrupted DTUs.

Example 2 includes the subject matter of example 1, including or omitting optional elements, wherein the IN tool includes symbol circuitry configured to convert a group of corrupted DTUs to a corresponding series of corrupted data symbols on which the corrupted DTUs are mapped.

Example 3 includes the subject matter of example 2, including or omitting optional elements, wherein the INM tool is configured to identify a first corrupted data symbol and a last corrupted data symbol in the IN event as the start and stop boundaries of the IN event.

Example 4 includes the subject matter of example 1, including or omitting optional elements, wherein the IN tool comprises bridge circuitry configured to: identify the non-data symbols and non-transmission time proximate in time to a group of corrupted DTUs and determine whether to include the non-data symbols or non-transmission time in an IN event that includes the group of DTUs.

Example 5 includes the subject matter of example 4, including or omitting optional elements, wherein the bridge circuitry is configured to: identify a first sequence of identified corrupted DTUs detected at an end of one transmission frame; identify a second sequence of identified corrupted DTUs detected at a beginning of a next subsequent transmission frame; and identify a single IN event that includes symbols corresponding to the first sequence of corrupted DTUs, symbols corresponding to the second sequence of corrupted DTUs, and non-data symbols and non-transmission time occurring between the first sequence and the second sequence.

Example 6 includes the subject matter of example 1, including or omitting optional elements, wherein the INM tool includes monitor circuitry configured to identify a DTU received by the transceiver as a corrupted DTU by performing a DTU-specific CRC check on the DTU.

Example 7 includes the subject matter of example 1, including or omitting optional elements, wherein the INM tool includes monitor circuitry configured to identify a DTU transmitted by the transceiver as a corrupted DTU by interpreting a communication from a target transceiver to which the DTU is transmitted that indicates that the DTU is corrupted.

Example 8 includes the subject matter of example 1, including or omitting optional elements, wherein the INM tool includes monitor circuitry configured to identify a DTU transmitted by the transceiver as a corrupted DTU by: mapping DTUs in a retransmit queue to transmitted symbols; and identifying transmitted symbols corresponding to DTUs in the retransmit queue that are retransmitted as corrupted DTUs.

Example 9 includes the subject matter of exampled 1-8, including or omitting optional elements, wherein the INM tool is configured to identify a first IN event that includes corrupted DTUs received by the transceiver and a second IN event that includes corrupted DTUs transmitted by the transceiver that have a similar duration and inter arrival time; and identify the first IN event and the second IN event as correlated IN events occurring on both a transmit channel and a receive channel of the transceiver.

Example 10 is a method that includes identifying a data stream transmitted or received by a transceiver that includes i) data transmission units (DTUs) communicating data symbols, ii) non-data symbols, and iii) non-transmission time; identifying one or more corrupted DTUs in the data stream; grouping corrupted DTUs by evaluating a count, frequency, pattern, cluster, or sequence of the corrupted DTUs; associating a selected number of non-data symbols and/or non-transmission time with the group of corrupted DTUs; defining an IN event that includes the non-data symbols and/or non-transmission time and the group of corrupted DTUs; and communicating one or more IN event parameters describing the IN event to IN noise mitigation circuitry for use by the transceiver in mitigating IN.

Example 11 includes the subject matter of example 10, including or omitting optional elements, further including converting the group of corrupted DTUs to corresponding number of corrupted data symbols on which the corrupted DTUs are mapped; and characterizing the IN event as having a time duration corresponding to the number of corrupted data symbols and the number of non-data symbols and/or non-transmission time associated with the group of corrupted DTUs.

Example 12 includes the subject matter of example 11, including or omitting optional elements, further including identifying a first corrupted data symbol and a last corrupted data symbol as the start and stop time boundaries of the IN event.

Example 13 includes the subject matter of example 10, including or omitting optional elements, further including identifying a first sequence of corrupted data symbols detected at an end of one transmission frame; identifying a second sequence of corrupted data symbols detected at a beginning of a next subsequent transmission frame; and identifying a single IN event that includes the first sequence of corrupted data symbols, the second sequence of corrupted data symbols, and non-data symbols or non-transmission time occurring between the first sequence and the second sequence.

Example 14 includes the subject matter of example 10, including or omitting optional elements, further including identifying a DTU received by the transceiver as a corrupted DTU by performing a DTU-specific CRC check on the DTU.

Example 15 includes the subject matter of example 10, including or omitting optional elements, further including identifying a DTU transmitted by the transceiver as a corrupted DTU by interpreting a communication from a target transceiver to which the DTU is transmitted that indicates that the DTU is corrupted.

Example 16 includes the subject matter of example 10, including or omitting optional elements, further including identifying a DTU transmitted by the transceiver as a corrupted DTU by: mapping DTUs in a retransmit queue to transmitted symbols; and identifying transmitted symbols corresponding to DTUs in the retransmit queue that are retransmitted as corrupted DTUs.

Example 17 includes the subject matter of examples 10-16, including or omitting optional elements, further including identifying a first IN event that includes corrupted DTUs received by the transceiver and a second IN event that includes corrupted DTUs transmitted by the transceiver that have a similar duration and inter arrival time; and identifying the first IN event and the second IN event as correlated IN events occurring on both a transmit channel and a receive channel of the transceiver.

Example 18 is an impulse noise (IN) tool, including monitor circuitry configured to identify a data stream transmitted or received by a transceiver that includes i) data transmission units (DTUs) communicating data symbols and ii) non-data symbols and bridge circuitry. The bridge circuitry is configured to: identify one or more corrupted DTUs in the data stream; group corrupted DTUs by evaluating a count, frequency, pattern, cluster, or sequence of the corrupted DTUs; associate a number of non-data symbols or non-transmission time with the group of corrupted DTUs; and define an IN event that includes the non-data symbols or the non-transmission time and the group of corrupted DTUs. The IN tool is configured to communicate one or more IN event parameters describing the IN event to IN noise mitigation circuitry for use by the transceiver in mitigating IN.

Example 19 includes the subject matter of example 18, including or omitting optional elements, further including symbol circuitry configured to convert the group of corrupted DTUs to corresponding number of corrupted data symbols on which the corrupted DTUs are mapped, wherein the IN tool is configured to characterize the IN event as having a time duration corresponding to the number of corrupted data symbols, the non-transmission time, and the number of non-data symbols associated with the group of corrupted DTUs.

Example 20 includes the subject matter of example 18, including or omitting optional elements, wherein the bridge circuitry is further configured to: identify a first sequence of corrupted data symbols detected at an end of one transmission frame; identify a second sequence of corrupted data symbols detected at a beginning of a next subsequent transmission frame; and identify a single IN event that includes the first sequence of corrupted data symbols, the second sequence of corrupted data symbols, and non-data symbols or non-transmission time occurring between the first sequence and the second sequence.

Example 21 includes the subject matter of example 18, including or omitting optional elements, wherein the monitor circuitry is configured to identify a DTU transmitted by the transceiver as a corrupted DTU by: mapping DTUs in a retransmit queue to transmitted symbols; and identifying transmitted symbols corresponding to DTUs in the retransmit queue that are retransmitted as corrupted DTUs.

Example 22 is an apparatus, including: means for identifying a data stream transmitted or received by a transceiver that includes i) data transmission units (DTUs) communicating data symbols, ii) non-data symbols, and iii) non-transmission time; means for identifying one or more corrupted DTUs in the data stream; means for grouping corrupted DTUs by evaluating a count, frequency, pattern, cluster, or sequence of the corrupted DTUs; means for associating a selected number of non-data symbols and/or non-transmission time with the group of corrupted DTUs; means for defining an IN event that includes the non-data symbols and/or non-transmission time and the group of corrupted DTUs; and means for communicating one or more IN event parameters describing the IN event to IN noise mitigation circuitry for use by the transceiver in mitigating IN.

Example 23 includes the subject matter of example 22, including or omitting optional elements, further including means for identifying a first sequence of corrupted data symbols detected at an end of one transmission frame; means for identifying a second sequence of corrupted data symbols detected at a beginning of a next subsequent transmission frame; and means for identifying a single IN event that includes the first sequence of corrupted data symbols, the second sequence of corrupted data symbols, and non-data symbols or non-transmission time occurring between the first sequence and the second sequence.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application.

What is claimed is:

1. A transceiver, comprising an impulse noise monitoring (INM) tool configured to:
   identify a data stream that includes i) data transmission units (DTUs) communicating data symbols, ii) non-data symbols, and iii) non-transmission time;
   ascertain a single impulse noise (IN) event of the incoming data stream by evaluating a count, a frequency, a pattern, a group, or a sequence of corrupted DTUs and selected non-data symbols or non-transmission time that are proximate in time to the corrupted DTUs, wherein the INM tool includes monitor circuitry configured to identify a DTU transmitted by the transceiver as a corrupted DTU by:
   mapping DTUs in a retransmit queue to transmitted symbols; and
   identifying transmitted symbols corresponding to DTUs in the retransmit queue that are retransmitted as corrupted DTUs.

2. The transceiver of claim 1, wherein the INM tool comprises:
   symbol circuitry configured to convert a group of corrupted DTUs to a corresponding series of corrupted data symbols on which the corrupted DTUs are mapped.

3. The transceiver of claim 2, wherein the INM tool is configured to identify a first corrupted data symbol and a last corrupted data symbol in the IN event as the start and stop boundaries of the IN event.

4. The transceiver of claim 1, wherein the INM tool comprises bridge circuitry configured to:
   identify the non-data symbols and non-transmission time proximate in time to a group of corrupted DTUs;
   determine whether to include the non-data symbols or non-transmission time in an IN event that includes the group of DTUs.

5. The transceiver of claim 4, wherein the bridge circuitry is configured to:
   identify a first sequence of identified corrupted DTUs detected at an end of one transmission frame;
   identify a second sequence of identified corrupted DTUs detected at a beginning of a next subsequent transmission frame;
   identify a single IN event that includes symbols corresponding to the first sequence of corrupted DTUs, symbols corresponding to the second sequence of corrupted DTUs, and non-data symbols and non-transmission time occurring between the first sequence and the second sequence.

6. The transceiver of claim 1, wherein the INM tool includes monitor circuitry configured to identify a DTU received by the transceiver as a corrupted DTU by performing a DTU-specific CRC check on the DTU.

7. The transceiver of claim 1, wherein the INM tool includes monitor circuitry configured to identify a DTU transmitted by the transceiver as a corrupted DTU by interpreting a communication from a target transceiver to which the DTU is transmitted that indicates that the DTU is corrupted.

8. The transceiver of claim 1, wherein the INM tool is configured to:
   identify a first IN event that includes corrupted DTUs received by the transceiver and a second IN event that includes corrupted DTUs transmitted by the transceiver that have a similar duration and inter arrival time; and identify the first IN event and the second IN event as correlated IN events occurring on both a transmit channel and a receive channel of the transceiver, DTU transmitted by the transceiver as a corrupted DTU by interpreting a communication from a target transceiver to which the DTU is transmitted that indicates that the DTU is corrupted.

9. A method, comprising:

identifying a data stream transmitted or received by a transceiver that includes i) data transmission units (DTUs) communicating data symbols, ii) non-data symbols, and iii) non-transmission time;

identifying one or more corrupted DTUs in the data stream;

grouping corrupted DTUs by evaluating a count, frequency, pattern, cluster, or sequence of the corrupted DTUs;

associating a selected number of non-data symbols and/or non-transmission time with the group of corrupted DTUs;

defining a single impulse noise (IN) event that includes the non-data symbols and/or the non-transmission time and the group of corrupted DTUs;

communicating one or more IN event parameters describing the IN event to IN noise mitigation circuitry for use by the transceiver in mitigating IN;

identifying a first IN event that includes corrupted DTUs received by the transceiver and a second IN event that includes corrupted DTUs transmitted by the transceiver that have a similar duration and inter arrival time; and identifying the first IN event and the second IN event as correlated IN events occurring on both a transmit channel and a receive channel of the transceiver.

10. The method of claim 9, further comprising:

converting the group of corrupted DTUs to corresponding number of corrupted data symbols on which the corrupted DTUs are mapped;

characterizing the IN event as having a time duration corresponding to the number of corrupted data symbols and the number of non-data symbols and/or non-transmission time associated with the group of corrupted DTUs.

11. The method of claim 10, further comprising identifying a first corrupted data symbol and a last corrupted data symbol as the start and stop time boundaries of the IN event.

12. The method of claim 9, further comprising identifying a first sequence of corrupted data symbols detected at an end of one transmission frame;

identifying a second sequence of corrupted data symbols detected at a beginning of a next subsequent transmission frame; and identifying a single IN event that includes the first sequence of corrupted data symbols, the second sequence of corrupted data symbols, and non-data symbols or non-transmission time occurring between the first sequence and the second sequence.

13. The method of claim 9, further comprising identifying a DTU received by the transceiver as a corrupted DTU by performing a DTU-specific CRC check on the DTU.

14. The method of claim 9, further comprising identifying a DTU transmitted by the transceiver as a corrupted DTU by interpreting a communication from a target transceiver to which the DTU is transmitted that indicates that the DTU is corrupted.

15. The method of claim 9, further comprising identifying a DTU transmitted by the transceiver as a corrupted DTU by:

mapping DTUs in a retransmit queue to transmitted symbols; and identifying transmitted symbols corresponding to DTUs in the retransmit queue that are retransmitted as corrupted DTUs.

16. An impulse noise monitoring (INM) tool, comprising:

monitor circuitry configured to identify a data stream transmitted or received by a transceiver that includes i) data transmission units (DTUs) communicating data symbols and ii) non-data symbols; and bridge circuitry configured to:

identify one or more corrupted DTUs in the data stream, wherein the monitor circuitry is configured to identify a DTU transmitted by the transceiver as a corrupted DTU by identifying transmitted symbols corresponding to DTUs in the retransmit queue that are retransmitted as corrupted DTUs;

group corrupted DTUs groups of corrupted DTUs by evaluating a count, frequency, pattern, cluster, or sequence of the corrupted DTUs;

associate a number of non-data symbols or non-transmission time with the group of corrupted DTUs; and define a single IN event that includes the non-data symbols or the non-transmission time and the group of corrupted DTUs;

the INM tool configured to communicate one or more IN event parameters describing the IN event to IN noise mitigation circuitry for use by the transceiver in mitigating IN.

17. The INM tool of claim 16, further comprising symbol circuitry configured to convert the group of corrupted DTUs to corresponding number of corrupted data symbols on which the corrupted DTUs are mapped, wherein the INM tool is configured to characterize the IN event as having a time duration corresponding to the number of corrupted data symbols, the non-transmission time, and the number of non-data symbols associated with the group of corrupted DTUs.

18. The INM tool of claim 16, wherein the bridge circuitry is further configured to:

identify a first sequence of corrupted data symbols detected at an end of one transmission frame;

identify a second sequence of corrupted data symbols detected at a beginning of a next sub sequent transmission frame; and identify a single IN event that includes the first sequence of corrupted data symbols, the second sequence of corrupted data symbols, and non-data symbols or non-transmission time occurring between the first sequence and the second sequence.

19. The INM tool of claim 16, wherein the monitor circuitry is configured to identify a DTU transmitted by the transceiver as a corrupted DTU by:

mapping DTUs in a retransmit queue to transmitted symbols.

* * * * *